United States Patent
Sturtevant

(10) Patent No.: US 10,459,720 B2
(45) Date of Patent: Oct. 29, 2019

(54) COMPUTER-IMPLEMENTED TOOLS AND METHODS FOR EXTRACTING INFORMATION ABOUT THE STRUCTURE OF A LARGE COMPUTER SOFTWARE SYSTEM, EXPLORING ITS STRUCTURE, DISCOVERING PROBLEMS IN ITS DESIGN, AND ENABLING REFACTORING

(71) Applicant: Silverthread, Inc., Cambridge, MA (US)

(72) Inventor: Daniel J. Sturtevant, Newton, MA (US)

(73) Assignee: Silverthread, Inc., Boston, MA (US)

( * ) Notice: Subject to any disclaimer, the term of this patent is extended or adjusted under 35 U.S.C. 154(b) by 0 days.

(21) Appl. No.: 16/017,407

(22) Filed: Jun. 25, 2018

(65) Prior Publication Data

US 2018/0307482 A1    Oct. 25, 2018

Related U.S. Application Data

(62) Division of application No. 14/741,096, filed on Jun. 16, 2015, now Pat. No. 10,031,748.

(60) Provisional application No. 62/012,790, filed on Jun. 16, 2014.

(51) Int. Cl.
   *G06F 8/72*           (2018.01)
   *G06F 11/36*         (2006.01)
   *G06F 8/74*           (2018.01)
   *G06F 8/71*           (2018.01)

(52) U.S. Cl.
   CPC ............... *G06F 8/72* (2013.01); *G06F 8/71* (2013.01); *G06F 8/74* (2013.01); *G06F 11/3604* (2013.01)

(58) Field of Classification Search
None
See application file for complete search history.

(56) References Cited

U.S. PATENT DOCUMENTS

| | | | |
|---|---|---|---|
| 7,966,356 B2 | 6/2011 | Sangal et al. | |
| 8,930,919 B2 | 1/2015 | Bhaskara et al. | |
| 2002/0087949 A1 | 7/2002 | Golender et al. | |
| 2005/0160411 A1 | 7/2005 | Sangal et al. | |
| 2005/0278688 A1 | 12/2005 | Buskens et al. | |
| 2006/0064681 A1 | 3/2006 | Robinson | |
| 2006/0117306 A1 | 6/2006 | Kimura et al. | |
| 2006/0212759 A1 | 9/2006 | Campbell et al. | |
| 2008/0201129 A1 | 8/2008 | Natvig | |

(Continued)

FOREIGN PATENT DOCUMENTS

WO    WO-2004/079529 A2    9/2004

OTHER PUBLICATIONS

Al-Kofahi, Jafar M., "Detecting semantic changes in Makefile build code," Sep. 23, 2012, IEEE, pp. 1-10.

(Continued)

*Primary Examiner* — Syed A Roni
(74) *Attorney, Agent, or Firm* — Foley Hoag LLP; Rajesh Vallabh

(57) ABSTRACT

An interrelated set of tools and methods are disclosed for recording the identity of software components responsible for creating files, recording the identity of software components that access software files, reasoning about the dependency relationships between software components, identifying and reporting undesirable dependencies between them, and reporting other useful information about a large-scale software architecture by instrumenting a software build process or test process.

31 Claims, 8 Drawing Sheets

(56) References Cited

U.S. PATENT DOCUMENTS

| | | |
|---|---|---|
| 2009/0187894 A1 | 7/2009 | Bell et al. |
| 2010/0042974 A1 | 2/2010 | Gutz et al. |
| 2011/0035726 A1 | 2/2011 | Davies et al. |
| 2011/0258603 A1 | 10/2011 | Wisnovsky et al. |
| 2011/0283253 A1 | 11/2011 | Dutta et al. |
| 2012/0079447 A1 | 3/2012 | Arnott et al. |

OTHER PUBLICATIONS

Auditd tool to capture kernel API calls in Linux: http://security.blogoverflow.com/2013/01/a-brief-introduction-to-auditd/, last accessed Mar. 27, 2017.

DiskMon tool which can report disk usage events in Windows https://technet.microsoft.com/en-us/sysinternals/diskmon.aspx, last accessed Mar. 27, 2017.

Dtrace tool (a similar tool) more commonly found on Sun/Oracle SPARC UNIX machines https://en.wikipedia.org/wiki/DTrace, last accessed Mar. 27, 2017.

EasyHook tool to intercept Windows APIs https://easyhook.github.io/, last accessed Mar. 27, 2017.

Eppinger, et al., "Design Structure Matrix Methods and Applications," https://mitpress.mit.edu/books/design-structure-matrix-methods-and-applications, last accessed Mar. 27, 2017.

LD_PRELOAD dynamic injection to insert an intercept program http://www.linuxjournal.com/article/7795, last accessed Mar. 27, 2017.

MacCormack, et al., "Exploring the duality between product and organizational architectures: A test of the mirroring hypothesis," Harvard Business School Working Paper No. 08-039, 2008.

Pimmler, et al., "Integration analysis of product decompositions," presented at the ASME Design Theory and Methodology Conference, Minneapolis, MN, 1994.

RedHat's RPM package management tool—example of a tool that builds and packages software components in a way that promotes modularity and hierarchical components across a computer system, using public interfaces and component dependencies. There are other similar systems including Debian's DPKG tool, Ruby language Gems, Perl language's CPAN system, etc. RPM is a good example https://en.wikipedia.org/wiki/RPM_Package_Manager, last accessed Mar. 27, 2017.

Sangal, et al., "Using Dependency Models to Manage Complex Software Architecture," Oct. 16, 2005, pp. 167-176.

Scitools' 'Understand' product which can use static analysis to extract entities and dependencies in a codebase by statically analyzing software source code https://scitools.com/, last accessed Mar. 27, 2017.

Strace tool to extract system calls, including file opening which we use to trace dependencies https://en.wikipedia.org/wiki/Strace, last accessed Mar. 27, 2017.

International Search Report and Written Opinion for PCT/US2015/036048, dated Dec. 14, 2015.

Extended European Search Report issued by the European Patent Office in corresponding Application No. EP 15810349.9, dated Nov. 22, 2017.

COMPUTER-IMPLEMENTED TOOLS AND METHODS FOR EXTRACTING INFORMATION ABOUT THE STRUCTURE OF A LARGE COMPUTER SOFTWARE SYSTEM, EXPLORING ITS STRUCTURE, DISCOVERING PROBLEMS IN ITS DESIGN, AND ENABLING REFACTORING

CROSS REFERENCE TO RELATED APPLICATIONS

This application is a divisional of U.S. patent application Ser. No. 14/741,096 filed Jun. 16, 2015 entitled COMPUTER-IMPLEMENTED TOOLS AND METHODS FOR EXTRACTING INFORMATION ABOUT THE STRUCTURE OF A LARGE COMPUTER SOFTWARE SYSTEM, EXPLORING ITS STRUCTURE, DISCOVERING PROBLEMS IN ITS DESIGN, AND ENABLING REFACTORING, which claims priority from U.S. Provisional Patent Application No. 62/012,790 filed on Jun. 16, 2014 entitled METHODS AND SYSTEMS FOR EXTRACTING INFORMATION ABOUT THE STRUCTURE OF A LARGE SOFTWARE SYSTEM, EXPLORING ITS STRUCTURE, AND DISCOVERING PROBLEMS IN ITS DESIGN, AND ENABLING REFACTORING, both of which applications are hereby incorporated by reference.

BACKGROUND

The present application generally relates to computer-implemented methods and systems for analyzing large software systems. More particularly, it relates to an interrelated set of tools and methods for recording the identity of software components responsible for creating files, recording the identity of software components that access software files, reasoning about the dependency relationships between software components, identifying and reporting undesirable dependencies between them, and reporting other useful information about a large-scale software architecture by instrumenting a software build process or test process. The term "software component" as used herein is intended to mean a software package or a software module of a software system.

Software systems today can be composed of millions of entities (files, functions, classes, methods, data structures, web services, databases, etc.) that are connected in many ways. These systems can be heterogeneous—made up of code written in dozens of languages, compiled or interpreted and used on multiple operating systems, and incorporating many third party technologies including open-source and proprietary tools and libraries. Designing and maintaining these systems is difficult, and keeping the complexity in the system under control is an important concern. When complexity causes different elements of a system to interact in unanticipated ways, or when parts of a system are so complex that they move beyond the bounds of human cognitive capacities, a host of interconnected problems can begin to occur. When engineers lose control of complexity in a system's design, it can lead to project failure, business failure, and/or man-made disaster. Even systems of high quality with a sustainable level of overall complexity may have some sub-systems or cross-cutting concerns that are unmanageable and incomprehensible.

In order to maintain long-term health in large systems, engineers often employ patterns in their designs to keep architectural complexity in check. From a macro-perspective, well-architected systems are structured as hierarchies of modules, have APIs, employ abstraction-layering schemes, and have reusable components. When carefully applied, such patterns can aid developer comprehension and enable independence of action between people and teams in large organizations. They can also endow systems with a variety of beneficial properties including comprehendability, reliability, evolvability, scalability, and flexibility, just to name a few.

Modular architectures are composed of distinct semi-autonomous structures with formal boundaries that separate their internal environment from the outside world. Robust modules have the property of "homeostasis"—their internal functioning is not easily disrupted by fluctuations in the external environment. Modular systems contain many independent components, each of which can change or evolve separately with minimal impact on each other or on the system as a whole. Modules hide information in the sense that the use of one only requires a client to understand its public interface, not its complex internals.

A hierarchical system is composed of elements whose dependency relationships form a directed acyclic graph (DAG). While, a hierarchy may not contain cycles, it can contain multiple source and sync nodes, and can both diverge and converge. A tree is a common type of hierarchy that fans out from a single root (or controller node) and never converges. A layered system is also a kind of hierarchy. Hierarchies are pervasive organizing patterns in many real-world systems. Hierarchical organization assists designers by reducing the cognitive burden placed on the human mind when examining a system from any one vantage point. Hierarchies also facilitate top-down control and the imposition of safety constraints. They are useful structures for classifying, storing, and searching for information. Finally, the requirement that a hierarchy contains no cyclic connections reduces the possibility that feedback loops will be formed between widely separated components. These feedback loops or cycles can hinder change or lead to undesirable change propagation during the design process.

Layers combine the notion of hierarchy and modularity in a manner that serves to contain complexity and endow a system with a variety of beneficial properties. Layers in systems provide services to components above them while relying on services provided by those below. They combine the notion of directionality found in hierarchies with the notion of information hiding found in modules. Conceptual layers in a design are sometimes called abstractions. Layering hides information in a stronger manner than modularity does because it partitions a complex network of components into two distinct regions that may be considered independently. In addition to hiding details, abstraction layers may embody new higher-level concepts by aggregating diverse facilities into a useful coherent whole. Abstraction layers can also partition systems by engineering discipline or be responsible for defining the boundaries between disciplines. The transistor, for instance, creates a useful barrier that allows electrical engineers to study quantum mechanics while computer engineers can study Boolean logic. The creation of new abstraction layers is an important way reuse is achieved in software.

Some new empirical and quantitative research suggests that code that adheres to these principles costs less to develop, adapt, and maintain. An MIT dissertation published in February 2013 titled "System Design and the Cost of Architectural Complexity" by Daniel J. Sturtevant finds that modular, hierarchical, and layered code has fewer defects than code in which those properties are absent or have degraded, and that software engineers working in architecturally sound code are also more productive and have higher morale. This dissertation built upon a prior body of work done by Alan MacCormack, Carliss Baldwin, and John Rusnak in which they explored software codebases using static analysis tools to extract dependencies between software elements and then used network analysis and design structure matrix (DSM) techniques to examine modular and hierarchical properties of those software systems.

BRIEF SUMMARY OF THE DISCLOSURE

In accordance with one or more embodiments, a computer-implemented method is disclosed for identifying undesirable dependencies among a plurality of software components in a software system. The method, performed by a computer system, includes the steps of: (a) receiving information on the software components in the software system, the resources owned or controlled by each software component, and the resources each software component can make use of as declared by metadata in order to identify the intended dependence relationships among the software components; (b) analyzing the software system to determine which software component created each non-source file and to determine which software component accessed which source file or non-source file during its build process, during testing, or during runtime to generate information on the software components and their actual dependence relationships based on use by each software component of resources owned or controlled by another software component; (c) testing consistency between the information received in step (a) and the information generated in step (b) to identify dependency errors; and (d) reporting the dependency errors identified in step (c).

A computer system in accordance with one or more embodiments comprises at least one processor, memory associated with the at least one processor, and a program supported in the memory for identifying undesirable dependencies among a plurality of software components in a software system. The program contains a plurality of instructions which, when executed by the at least one processor, cause the at least one processor to: (a) receive information on the software components in the software system, the resources owned or controlled by each software component and the resources each software component can make use of as declared by metadata in order to identify the intended dependence relationships among the software components; (b) analyze the software system to determine which software component created each non-source file and to determine which software component accessed which source file or non-source file during its build process, during testing, or during runtime to generate information on the software components and their actual dependence relationships based on use by each software component of resources owned or controlled by another software component; (c) test consistency between the information received in step (a) and the information generated in step (b) to identify dependency errors; and (d) report the dependency errors identified in step (c).

In accordance with one or more further embodiments, a computer-implemented method is disclosed for exploring the structure of a software system executing on a computer system comprising a plurality of software components. The method comprises the steps, performed by the computer system of: (a) determining which software component in the computer system created each non-source file during its build process; (b) determining which software component in the computer system accessed which source file or non-source file during its build process, during testing, or during runtime; (c) reporting information generated in steps (a) and (b).

A computer system in accordance with one or more embodiments comprises at least one processor, memory associated with the at least one processor, and a program supported in the memory for exploring the structure of a software system executing on the computer system comprising a plurality of software components. The program contains a plurality of instructions which, when executed by the at least one processor, cause the at least one processor to: (a) determine which software component in the computer system created each non-source file during its build process; (b) determine which software component in the computer system accessed which source file or non-source file during its build process, during testing, or during runtime; (c) report information generated in steps (a) and (b).

In accordance with one or more further embodiments, a computer-implemented method is disclosed for auditing a computer program. The method, performed by a computer system, includes the steps of: (a) executing the computer program and an audit program on the computer system; (b) using the audit program to detect and log access to resources by the computer program and the child processes and threads that the computer program recursively spawns during its operation; (c) using the audit program to track and log the state of child processes and threads used to resolve the fully qualified paths of all resources being accessed; (d) using the audit program to distinguish between and log read-only, read-write, create modes of resource access; (e) using the audit program to distinguish between and log transitory resources and outputs; (f) using the audit program to keep track of and log resources that were removed; and (g) using the audit program to keep track of and record information of renaming of files and directories.

A computer system in accordance with one or more embodiments comprises at least one processor, memory associated with the at least one processor, and an audit program supported in the memory for auditing a computer program. The audit program contains a plurality of instructions which, when executed by the at least one processor, cause the at least one processor to: (a) execute the computer program on the computer system with the audit program; (b) detect and log access to resources by the computer program and the child processes and threads that the computer program recursively spawns during its operation; (c) track and log the state of child processes and threads used to resolve the fully qualified paths of all resources being accessed; (d) distinguish between and log read-only, read-write, create modes of resource access; (e) distinguish between and log transitory resources and outputs; (f) keep track of and log resources that were removed; and (g) keep track of and record information of renaming of files and directories.

In accordance with one or more embodiments, a computer-implemented method is disclosed for auditing a plurality of computer programs to determine their relationships with one another. The method, performed by a computer system, includes the steps of: (a) executing the computer programs and an audit program on the computer system; (b) using the audit program to detect and log access to resources by each computer program and the child processes and threads that the computer program recursively spawns during its operation in order to determine which computer program used resources created by another computer program; (c) using the audit program to track and log the state of child processes and threads used to resolve the fully qualified paths of all resources being accessed; (d) using the audit program to distinguish between and log read-only, read-write, create modes of resource access; (e) using the audit program to distinguish between and log transitory resources and outputs; (f) using the audit program to keep track of and log resources that were removed; and (g) using the audit program to keep track of and record information of renaming of files and directories.

A computer system in accordance with one or more embodiments comprises at least one processor, memory associated with the at least one processor, and an audit program supported in the memory for auditing a plurality of computer programs to determine their relationships with one another. The audit program contains a plurality of instructions which, when executed by the at least one processor, cause the at least one processor to: (a) execute the computer programs on the computer system with the audit program; (b) detect and log access to resources by each computer program and the child processes and threads that the computer program recursively spawns during its operation in order to determine which computer program used resources created by another computer program; (c) track and log the state of child processes and threads used to resolve the fully qualified paths of all resources being accessed; (d) distinguish between and log read-only, read-write, create modes of resource access; (e) distinguish between and log transitory resources and outputs; (f) keep track of and log resources that were removed; and (g) keep track of and record information of renaming of files and directories.

DETAILED DESCRIPTION

In accordance with one or more embodiments, a set of interrelated processes and technologies are provided that can be used by leaders in a software development organization to manage the development or improvement of large and complex software codebases by systematically targeting, eliminating, and preventing architectural complexity and better managing their structure at a high-level. The interrelated processes and technologies described herein are useful in combination, and some are also useful individually for more targeted or more general purposes.

The processes and technologies described herein are enabling facets of a methodology for refactoring large, complex, and potentially problematic codebases. They may also be used to maintain architectural quality after refactoring or to prevent architecture problems from developing. This methodology can help hundreds of engineers and managers across a development organization, all working on a large codebase or interrelated set of codebases, to decouple, simplify, stabilize, and control their system over time. In accordance with one or more embodiments, they can do this by:

(1) Defining new architectural relationships, rules, and metadata within a codebase that describe the composition of high-level software components and the relations between them. This taxonomy can be used to describe the intended structure of the system as it relates to that system's modularity, hierarchy, layering, and reuse/commonality.

(2) Analyzing the system using one or more methods to extract information about the actual entities and relationships in the software system (such as build auditing, static analysis, or runtime analysis).

(3) Checking consistency between relationships extracted using different methods and uncovering errors in architecture info extraction.

(4) Visualizing the software system to gain insight into how it is structured.

(5) Testing consistency between the intended architectural properties of the system and the actual relationships that exist in a living codebase and do error checking.

(6) Examining gaps between the architectural relationships and rules they expect their codebase to adhere to, and the actual shape and dependency structure within the codebase, so that they can proactively find and fix violations of architectural rules.

(7) Exploring good courses of action and planning refactoring efforts to bring the code in conformance with desired architectural relationships.

(8) Refactoring the code.

(9) Verifying that changes had the desired effect on the architecture.

(10) Enforcing rules using a 'ratcheting mechanism' to prevent new problems and the reintroduction of previously fixed ones, while tolerating preexisting problems, so the organization can evolve the architecture toward a compliant state over time.

(11) Refining the architectural description and continually improving the system as the organization learns.

Figure 1:
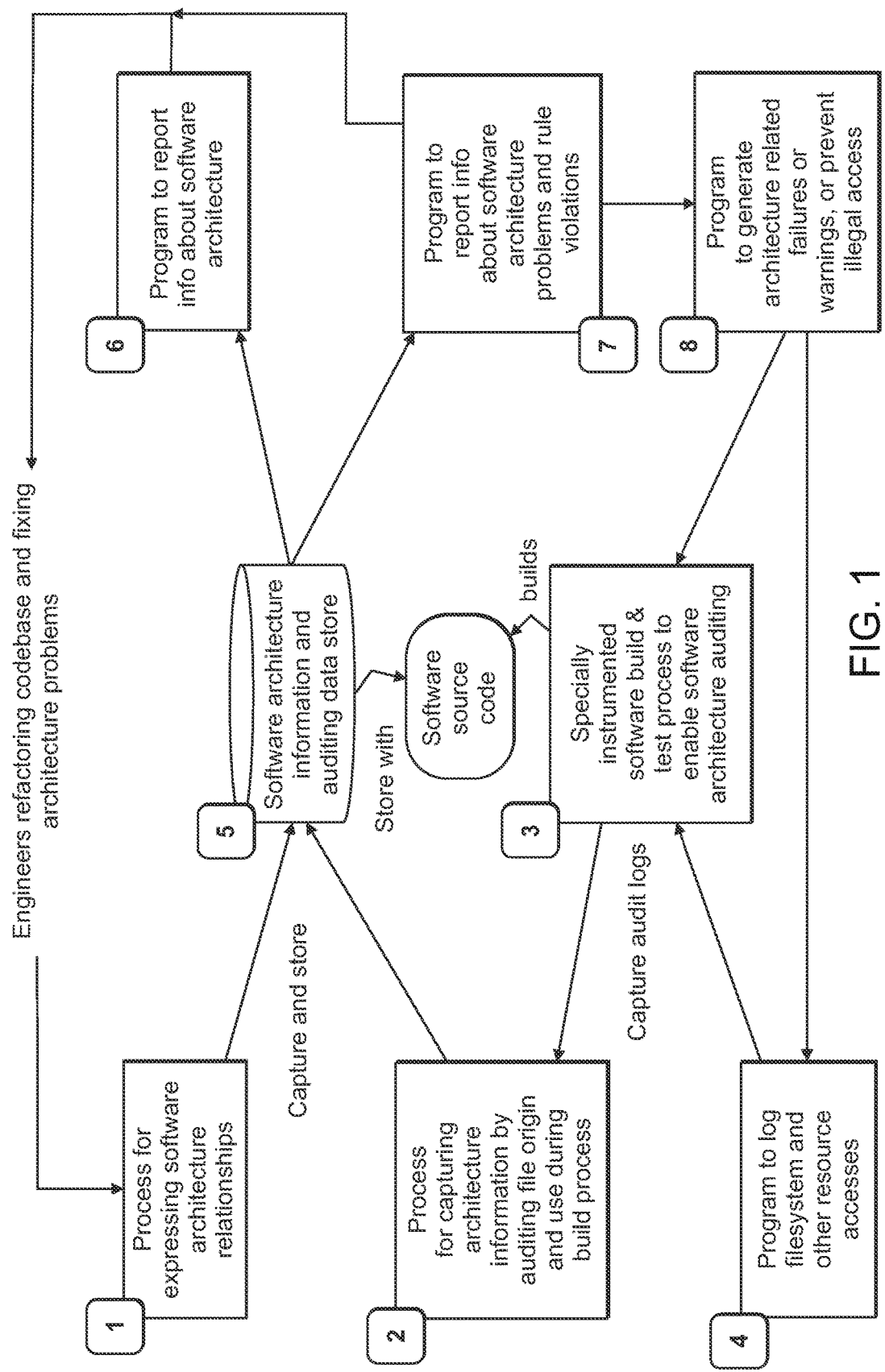
FIG. 1 illustrates the relationship between processes for analyzing software systems in accordance with one or more embodiments.

FIG. 1 illustrates the relationship between technologies and processes in accordance with one or more embodiments. The tools and processes can be used individually and in combination to help determine the identity of software components responsible for creating files, record the identity of software components that depend on software files or other resources such as web-services or databases, reasoning about the dependency relationships between software components, and identifying undesirable structure (such as illegal dependencies between them) by instrumenting a software build, testing, or run-time process.

Tools and processes in accordance with one or more embodiments include: (1) Computational process for logging file creation and resource access. Specific implementations of that process: in userspace at the system call layer, in userspace at the library call layer, in an operating system kernel, as a userspace filesystem, in a filesystem. (2) Process for collecting and data-structure for storing architecture information and information about filesystem access or the use of other resources during build time, test, or runtime. (3) Tool and process for causing a build, test, or integration process to fail if architecture violations are detected. (4) Tool and process for reporting relationships within and between software files and software components. (5) Tool and process for reporting illegal relationships within and between software files and software components.

1. Mechanism for Expressing Hierarchical, Modular, and Layered Relationships in A Software Architecture Using Components In a complex codebase, the relationships between source code files and subsystems may be unmanaged and unclear. The development organization might store source files in a large directory structure. A build process (using Make, Ant, or similar technologies) will traverse this source tree and manage the process of processing source files (such as C++source code or XML files containing documentation specifications) and generate non-source files (such as Dynamic-Link Library (DLL) or Portable Document Format (PDF) files). The codebase will contain complex chains of dependencies between files. For this reason, build systems have elaborate syntaxes for defining dependence relationships to manage the order in which files are processed. Unfortunately, in a heterogeneous codebase that has grown organically over time, direct and indirect file level relationships: (1) may form high-level patterns that are unclear or unknown to software developers, (2) may form highly coupled chains of interdependencies or cyclic groups that span the system or the organization, thereby thwarting efforts to maintain a modular and hierarchical codebase, and (3) may be unrecognized, leading to sporadic build failures.

In order to transform an architecturally complex codebase (or set of codebases) into a controlled hierarchy of modules with reuse/commonality and layers, an organization should: (1) Think through the natural boundaries that exist in the codebase and how different portions should be broken apart into distinct and controlled modules. (2) Introduce the idea of a software component, a container for source code files that is responsible for compiling its own source code into its own generated files, defines some of its files as being in its public interface (and therefore accessible to other components) while others are private, and defines dependency relationships between itself an other components. (3) Create tools for managing and maintaining software components in the codebase. (4) Partition the codebase, assigning each source code file to one of several components. (5) Restructure the build process so that each software component goes through its own distinct compilation process during which it accesses resources (particularly source code files, and possibly also resources such as databases or network connections), and generates new files. This may be done by creating per-component Makefiles, Ant files, Microsoft Visual Studio 'Solution' files, etc. (6) Restructure the test, and deployment processes so as to make each component responsible for driving those processes for its own code. (7) Define hierarchical dependency relationships, layered dependency relationships, and access control rules between and within components that define when components are allowed to make use of resources owned by other components, and when they are not. These dependencies may be used to drive the compilation process. While the build for each component can be invoked independently, the ability to compile any one component may depend on the prior compilation of upstream components because of resource dependencies. Dependencies in the build process will therefore cause builds invocations to be ordered so as to avoid building any component until those that it depends upon have already been built. (8) Components and component dependencies may also be used to regulate access to resources other than source files, such as web-services, database connections, or TCP/IP addresses and ports.

The idea of a software component is not new. Existing tools and frameworks include, e.g., the RedHat Linux package management system, Perl modules, Ruby Gems. These packaging schemes build upon and complement language specific facilities for supporting modularity such as the C++ shared library or the Java Jar file. These systems all help software engineers construct systems as collections of components that can be developed, built, tested, and installed or deployed semi-independently.

Components own source files and execute a build to create derived files. Components can define public interfaces for external use and private internals. Components declared dependencies on other components whose resources they require during build, test, or when deployed if the codebase adheres to these principles, the system is a hierarchy of components and abstraction layers.

Often, each component is a container for or manages: (1) Software source code, other source files, or other resources. (2) Metadata necessary to direct a build process, which parses source files and compiles them into binary, byte-compiled, or other generated forms. (3) Metadata specifying which files (both source and generated during the build) are intended for 'public access' (use outside the component)— either by other components during their compilation processes (for example C++ header files)—or by other components in a deployed application (such as executable files, shared libraries, documentation, etc.) Non-public files and resources are intended for use by the component itself, but not for use externally. (4) Metadata expressing explicit dependency relationships between components. These dependencies provide a mechanism allowing developers to define some resources as necessary prerequisites or required resources of other components. Upstream components will be built first, installed prior to, or made available during runtime prior to components that are downstream of them.

Different types of dependence or access control rules may be used to define different architectural patterns. Sometimes, cyclic component dependencies may be disallowed. When this is the case, components and their dependencies can be used to define a system as a hierarchy of modules and abstraction layers. Different types of dependencies can be used to express hierarchical or layered relations. For instance, if a dependency between a component A and B permits A access B's resources and resources of all components upstream from B, then developers can define the system as a hierarchy of modules. If a second type of dependency is used, which allows component A to access the resources of B, but does not grant further upstream access, then it is possible to express the idea of layering in the overall system. Other mechanisms such as access control rules defined within component metadata could also be used to allow or deny access to various resources so as to support a hierarchy and/or layering in the overall design.

Software components and dependence relationships are useful abstractions that sit between the level of individual files or other resources (at the low level) and the entire source code tree or software application (at the high level). These abstractions help software organizations impose order in the development process. This language for expressing modular boundaries and dependency relationships allows developers to declare architectural intent.

The scheme described here explicitly supports the notion of modularity by requiring engineers to partition a complex codebase into distinct modules, and by supporting the notion of public interfaces and private internals. Hierarchical relations emerge from non-cyclic dependence between modules. The scheme also supports the idea of architectural layering when metadata rules allow a developer to optionally require direct dependencies and disallow indirect dependencies (i.e., only a direct dependency from component A to component C permit A to access resources owned by C, while indirect dependencies A->B and B->C do not.) Frameworks can be set up in many ways to allow developers to define metadata for each component. Component metadata could be stored in a database, in an XML file, or in any other location accessible to the build process.

Software components should be responsible for driving a build process that consumes source files under their control and resources provided by other components and generates compiled files, libraries, etc. Components can also define a portion of their files and other resources as being intended for external use. These resources may be declared 'public' if they are intended for use by a non-owning downstream component during build, test, or runtime. To illustrate, .cpp or .java files might not be public, while .hpp and .dll files might be. A component may also have multiple types of 'public' files intended for installation or deployment in different contexts. For instance, an .hpp file might go into an SDK for use by other components during their build processes, while a .dll file might be deployed as part of a software application.

2. Process for Capturing Missing Information about File Origin and Use

Any refactoring of a codebase or a build process requires a developer to keep track of between-file dependencies so that highly coupled files can be moved together, and so that dependencies are not missed. An invasive refactoring effort that involves assigning files to components, splitting the build logic along component boundaries, and doing this while maintaining external dependencies and adhering to modularity rules requires an organization to have a comprehensive auditing mechanism to ensure that the job is done properly. Unfortunately, tools to enable such a process, especially when refactoring software applications built on older technologies, do not generally exist. It is difficult (especially when working in large heterogeneous codebases) to detect, analyze, visualize and gain insight into many of the dependence relationships that exist. Some limited solutions are available. Static analysis, for instance, can be used to track within-language dependencies for languages such as Java. Unfortunately, static analysis does not always correctly identify dependencies in some languages (such as C++ due to preprocessor directives, macros, include paths, and template code). Additional problems are introduced when dependencies span many languages, when a build system invokes tools to perform specialized tasks, or when dependencies occur within arbitrary scripts that are invoked from within the build process. Static analysis techniques cannot capture many of the important relationships that bind a software codebase together, allowing it to build, be tested, or run. This inability to uncover the difference between stated dependence relations and actual dependencies in a software asset makes it impractical to use static analysis exclusively to understand the structure of a complex codebase and assure the integrity of the system.

To overcome these limitations, methods and systems in accordance with one or more embodiments are provided for reasoning about software components and dependency relationships across a heterogeneous codebase, and software to generate correct and reasonably complete information file origin and resource access. This scheme can be used to determine: (1) which component C created each non-source file F during its build process, and (2) which components C1 . . . Cn accessed each file (source or generated) during their build processes, during testing, or during run-time, and whether the file access was in a 'read-write', 'read-only,' or 'create' mode.

If every file creation and access within the source code tree is traced to the accessing component, then it is possible to: (1) Know which component C created each non-source file F (thereby allowing us to define it as F's owner). (2) Know which components C1 . . . Cn accessed each file F during their build, test processes, or during runtime. (3) Know which files F1 . . . Fn each component C accessed. (4) Know which files F1 . . . Fn owned by component C were accessed by other components. (5) Know if a generated file F was created or "opened for writing" by multiple components (which may be illegal). (6) Know if a generated file F was deleted by its owner (making it transient) or a non-owner (which may be illegal) during the build process. (7) Know if a file F owned by component C1 was accessed by a non-owning component C2, and is therefore: (a) required to be in C1's public interface and (b) requires a dependency from C2->C1. (8) Know if a component C generated file F, and therefore has the right to put it in its public interface. (9) Know that a file (or other resource) access does not illegally span layer boundaries in the system.

As a further refinement, it is possible to map file accesses to specific parts of a component's build or test process, such as a specific line in its Makefile or a specific unit test. Additional information related to scope or levels of granularity can provide developers exploring dependency relationships better fidelity, giving them additional insight into the structure of the codebase and allowing them to diagnose problems and refactor software and component metadata more quickly. For instance, it is possible to determine the specific .dll that was being compiled within a component when it accessed a particular C++ header owned by another component.

A testing strategy can also be used to uncover runtime dependencies that may not be exposed at build time (possibly due to the use of message passing paradigms or interpreted languages). In order to do this, a similar scheme can be used to log all files accessed during the execution of a component's unit or system tests. If test coverage is robust, then execution of test points may trigger functionality requiring the dynamic loading of an unexpected shared library or the unexpected execution of a Python script. Auditing a test process can provide run-time dependency information to supplement built-time information.

In addition, this same scheme can be expanded to assert rules related to the access of other computer resources beyond files. For instance, a component framework might be defined in such a way that component owners are required to declare dependencies on resources such as database connections, tables within a database, shared memory, network connections, web services, or specialized hardware. Once instrumentation is in place to audit filesystem access, these schemes can be extended to detect the use of other resources from within a running application, or externally from within a specially instrumented operating system, network layer, or server process. While the present description often focuses on the filesystem, processes and technologies in accordance with one or more embodiments be extended to cover the inspection and auditing of these other types of resources as well.

Practical means of capturing information about the relationships between components and files by capturing information from the filesystem or other resources will be described in detail in sections 3 and 4. The use of this information to build a comprehensive map of the software architecture and audit conformance with architectural rules and design principles will be described in sections 5 onward.

3. Specially Instrumented Build Process

As described previously, component description metadata can be used by an organization either to define the expected architecture relationships in a codebase, or to define aspirational architectural relationships. In the latter case, an organization can define the ideal architecture, measure the gap between actual and desired, and close the gap by refactoring. This section describes techniques in accordance with one or more embodiments by which a build process can be instrumented to help engineers capture information about which files are created during a component's build process and which files or other resources are by a component. They can then use the information (in later steps) to identify improper linkages and improve the architecture. In order to do this, an organization working with a codebase should partition the system so each source file belongs to one component and modify and partition the build process so that each component's build can execute independently. For instance, each component may have its own Makefile. In addition, the organization may define component dependencies and configure the build system so that component dependencies are used to determine a build order. The organization may also define metadata identifying some files as 'public' and others as 'private.' Once components can be built independently and in combination, a program designed to audit the build process can be employed to identify the gap between architecture rules encoded in component metadata and the actual interdependence in the codebase.

1. Instrument a software build process so that identifying information (such as the name of the Component being built, Makefile name, PID, parent PID, etc.) is stored in environment variables. This state information can then be used to identify the build process and child processes and threads spawned by that program.

2. Instrument the build process so that every time it or any one of its sub-processes or threads creates or opens a software file (such as when it read a .cpp/.h file, creates a .so file, executes an AWK script, or loads a shared library), the filesystem access event is detected and is logged along with the current state information from 1. (The same instrumentation can be used to log the access of other resources placed under the control of the component model such as ports, web services, database connections, etc.).

3. An alternative to 2 is to instrument an operating system or a filesystem the build process is reading from or writing to so that the operating system or filesystem keeps logs of all accesses performed by the build process along with the current state information from 1.

4. In all cases, special care must be taken to discern between filesystem accesses performed by multiple sub-processes or threads executing in parallel (such as when Make is run with the –j flag) and to log each filesystem access appropriately.

In order to implement this scheme, any of the following technology options may be used. (In a section below, implementations using LD_PRELOAD and AuditD technologies are described in greater detail).

| Technology | Implementation Details | Platform |
|---|---|---|
| LD_PRELOAD | Allows dynamic shared libraries (.so files) to be injected into a program when execution starts, and allow those custom libraries to handle calls intended for other dynamic libraries. Preloaded libraries can act as proxies between the source program Glibc to capture and log open( ) and other relevant calls. | Linux & UNIX |
| EasyHook | Allows functionality to be injected into a program when execution starts, and allow the custom code to "hook" calls intended for dynamic libraries. Hooked functions can act as proxies between the source program and the intended library implementation of a particular piece of functionality in a manner similar to LD_PRELOAD libraries. | Windows |
| strace/dtrace | Allows a program to trace and log specific system calls made by a target program. | Linux & UNIX |
| Auditd kernel module (with modifications) | Allows the operating system to monitor a particular branch underneath a specified filesystem, log specific system calls occurring on those files, and log the PID/PPID of the program in userspace from within the kernel. Note that by default, there is no good way to distinguish between filesystem access emanating from the target program and another program accessing the same filesystem. Current AuditD logging technology does not record a program's many child PIDs. Each log entry only records the PID/PPID of the process invoking a system call. In order to meet requirements outlined above, the AuditD kernel code must be modified either to record the full chain of PIDs up to the init process (1) for processes accessing each monitored resource, or modified to log the value of one or more of the relevant process' environment variables (because environments are inherited by child processes) | Linux |
| DiskMon | Allows the operating system to monitor a specified filesystem and log specific system calls and PIDs of programs occurring in userspace from within the kernel. (Similar to AuditD). | Windows |
| FUSE Filesystem Driver | Allows a custom filesystem to be written as a userspace application rather than a kernel driver. This allows filesystem authors to create an abstract layer on top of kernel-level filesystems and log or modify filesystem and program behavior | Linux & UNIX |
| SMB Client/Server (Modified) | Modify a network filesystem on the client side to record state associated with the accessing program on the client side and details of | Linux & UNIX server, Linux & |

| Technology | Implementation Details | Platform |
|---|---|---|
| | the files being accessed or modified on both the client and server side as appropriate. | UNIX or Windows Client |
| NFS Client/Server (Modified) | Modify a network filesystem on the client side to record state associated with the accessing program on the client side and details of the files being accessed or modified on both the client and server side as appropriate. | Linux & Unix on both Server and Client side |

While in the base case, a single component's log might identify all resources accessed during that component's build, granularity can be added. For instance, if a component compiles multiple .dll or .jar files, or has other natural subdivision such as modules or directories, then it is possible to trace the access of specific resources to specific subsections of a component's build process so that later reporting has greater fidelity and is more actionable. One adaptation is to map file origin and access to specific Makefiles, lines in a Makefile, specific test files, or specific test points within components. This creates information useful during a refactoring effort before a preliminary component-based build- or test-infrastructure has been implemented. It would also be generally useful in any codebase where a complicated build system is in place and it is hard to determine the relationships between different Makefiles, determine which missing dependency to add to eliminate a sporadic build failure, or determine the full list of prerequisites for a sporadically failing test-point.

In accordance with one or more embodiments, the following describes an exemplary process for collecting and a data-structure for storing architecture information and filesystem access information during build time from a clean source-tree.

A. Set up a clean source code tree (aka sandbox) on a computer. Install all source controlled files and remove all generated files so that a build command will execute all steps rather than short-circuiting some resource access or resource creation steps.

B. Construct a data store for file information, component metadata, packaging information, information from the build process, and other architectural and access data. Create empty tables for later use. This data store could be a relational database, a nosql database, text files, spreadsheets, data structures stored in memory, etc. Examples in this text will use a relational database.

C. Optionally perform a pre-processing step to insert metadata associated with source files, other resources, and components into the database. Insert that information which is available prior to a build. This may include information such as:
  a. A list of components
  b. Component dependencies (direct and indirect), and dependency types
  c. A list of source files
  d. A list of other resources being managed as part of the architecture being examined or audited—such as database connections, web services, TCP/IP connections and ports,
  e. A mapping between components and source files (ownership)
  f. Information about the which files are in each components' public interface
  g. Other metadata associated with architecture, access control, code being stored, component type, etc.
  h. Other metrics which can be derived by examining the source tree D. Configure the build system to insert an interception and recording program into the build process or to start, stop, and/or restart an external interception and recording process built into the operating system or filesystem. This interception and recording program will insert information into the data store described in step B. Note that some of the technologies upon which such an interception and recording program could be built are described in the table above.

E. Execute a full build of the source code. This build will result in the creation of generated files by the build process and the creation of logs, data, or database entries by the interception and recording program.

F. Optionally, post-process logs to clean them and/or to filter out irrelevant information, duplicate information, extraneous information, or information that is unneeded during later steps.

G. Once the build process is complete, or upon completion of a single component's build, or in real time, insert information into the previously described data store that was produced by the interception and recording program. This information may include:
  a. The generated or non-source files that were produced by the build process
  b. The architecture (Linux, Mac, Windows, etc.) on which the build process was running when it created those generated files
  c. All files accesses by components during their build processes (and whether the access was for reading, writing, and optionally for creating)
  d. The component C whose build caused the creation of a file F, allowing us to consider C to be F's owner.
    i. Note that in some instances, it may be appropriate to use information about whether a file was opened for writing by a component as proof of ownership. It may not be necessary to demonstrate that the file was created for that purpose.
  e. Information about generated files that were produced by the build process, but for which the interception programs did not, or could not, record or determine the component responsible for bringing the file into existence. (Data gaps may exist due to tooling that only covers some architectures, skips some components, or has partial data for other reasons.)
  f. The component that put each generated file in its public interface.
  g. The access of other managed resources during each component's build process such as the use of a web address, port, web service, database connection, server, etc.
  h. More granular information about which part of a component's build was running when a file or other resource was accessed or created (such as which .so was being compiled, or which Makefile line or target was being executed.)
   i. Other relevant information gleaned from other sources such including static analysis tools, lint, compiler warnings, build system warnings, test failures, etc.
  H. If a component accesses a file or resource owned by another component, the access must be reconciled with design rules specifying whether a cross-component dependency is allowed and safe. A variety of other warnings or error conditions may be detectable as well. Combine or join data in such a way that rule violations or other problems can be effectively detected and reported. The data store may be manipulated to make reporting more efficient. This can include:
     a. Marking file or other resource accesses as legal or illegal when:
        i. Missing dependency
        ii. Wrong type of dependency
        iii. Indirect dependency where only direct dependencies allowed (to support layering)
        iv. Accessed file not in owning component's public interface
     b. Identify files owned by one component and placed in the public interface of another
     c. Identify files that are opened for writing by multiple components. (In this event, and in the absence of information allowing one to differentiate 'open for write' calls from 'file creation' calls one may use a heuristic to determine the ownership of a generated file. One may assign ownership to the component that opened the file first (temporally) and/or the component that is farther upstream in the build hierarchy.
     d. Identify SCM files (those managed by the source control system) that are opened for writing by the build process
  I. Generate reports on, or provide data for tools for reporting information about the structure of the software system, the relationship between files and components, the relationship between components, public interfaces, the access of files or other resources, and the legal and illegal relationships between components.

It should be noted that the concept of a component may be recursive in nature. Components may contain subcomponents at an arbitrary depth or be in various collections of packages. For instance, a software component may create multiple DLLs or Jars, each of which could be thought of as a specific subcomponent (albeit language specific ones). The auditing processes described above could be easily adapted to report information at various levels of depth to give developers granular information about where an access might occur. A build process could be instrumented to log and report the name of the software component that was building, the DLL being built, and even the specific build target being run when a file was accessed. Increasing granularity will produce logs with information that is easier to interpret and act upon.

It should also be noted that similar process can identify test-dependencies and run-time dependencies under some circumstances such as, e.g., when execution of a test-point causes a particular library file or other file containing relevant executable definition to load from the filesystem, or when it causes some other audited resource to be accessed.

4. Program for Detecting and Logging Resource Access

In accordance with one or more embodiments, an auditing program or script can be created to intercept and record the filesystem access of another target program during that target program's operation. The auditing program can also intercept and record the access of other managed resources.

The auditing program intercepts and logs library calls, system calls, or operating system calls emanating from the target program's process, child processes, and threads which relate to filesystem access or the access of other resources.

The auditing program differentiates between filesystem accesses that read, modify, or create files, directories, or links.

The auditing program resolves the fully qualified path of all files or directories accessed or modified while the target program is executing.

The auditing program tracks file and directory name changes, possibly recursive ones, that occur during while the target program is executing.

The auditing program logs activity for a program's 'child processes' and threads in addition to the top level 'parent process.'

The auditing program intercepts and logs the target program's resource access in a transparent manner and can be configured so that it does not unintentionally interfere with the normal functioning of the target program in any way. Preferably, the only way the auditing program should cause the target program to produce different outputs is by introducing of time delays, leaving open the possibility that a race-condition in the target program may be triggered. In the event that no race-condition is triggered, the output of the target program will be identical whether it is being observed or not. In the event that it is not possible or reasonable to be perfectly transparent, the program will attempt to operate as close to transparently as reasonable. In some cases, a choice may be made to avoid the logging of some relevant data in order to avoid introducing side-effects that would harm the capturing program's transparency. In some cases, a lack of transparency may be tolerable.

As an additional feature, the auditing program may be configured to intentionally interfere with the target program's resource accesses to modify the functioning of the target program. For example, the program may be configured to enforce access control rules by preventing the access of certain resources in real-time rather than logging rule violations for later use.

The auditing program can differentiate between files accessed by the target program and those accessed at the same time by other processes running in parallel on the same machine. It can either log all accesses and identify the subset performed by the target program for later filtering, or can log only those accesses done by the target program while ignoring those of unrelated applications.

The auditing program may log the time that each access was made, or may keep a time-consistent log so that the temporal ordering of filesystem accesses is maintained without exact times being recorded.

The following is an exemplary implementation of an LD_PRELOAD library for Linux, Mac OSX and other UNIX or UNIX-like operating systems.

One method of logging resource access for a program is to implement a dynamic library (.so on Linux, .dylib on Mac), which proxies common library calls such as 'fopen'. This library can be injected into a running executable when it is run using the LD_PRELOAD directive available on Linux/UNIX systems. This library will contain symbol signatures matching those of the library calls we intend to proxy, and will log access information in addition to calling the underlying glibc (or other) implementations of library calls we wish to report on. This scheme can be used to log information about resource access generally. To illustrate, the implementation described in this section will cover glibc calls related to the creation and opening of files.

Figure 2:
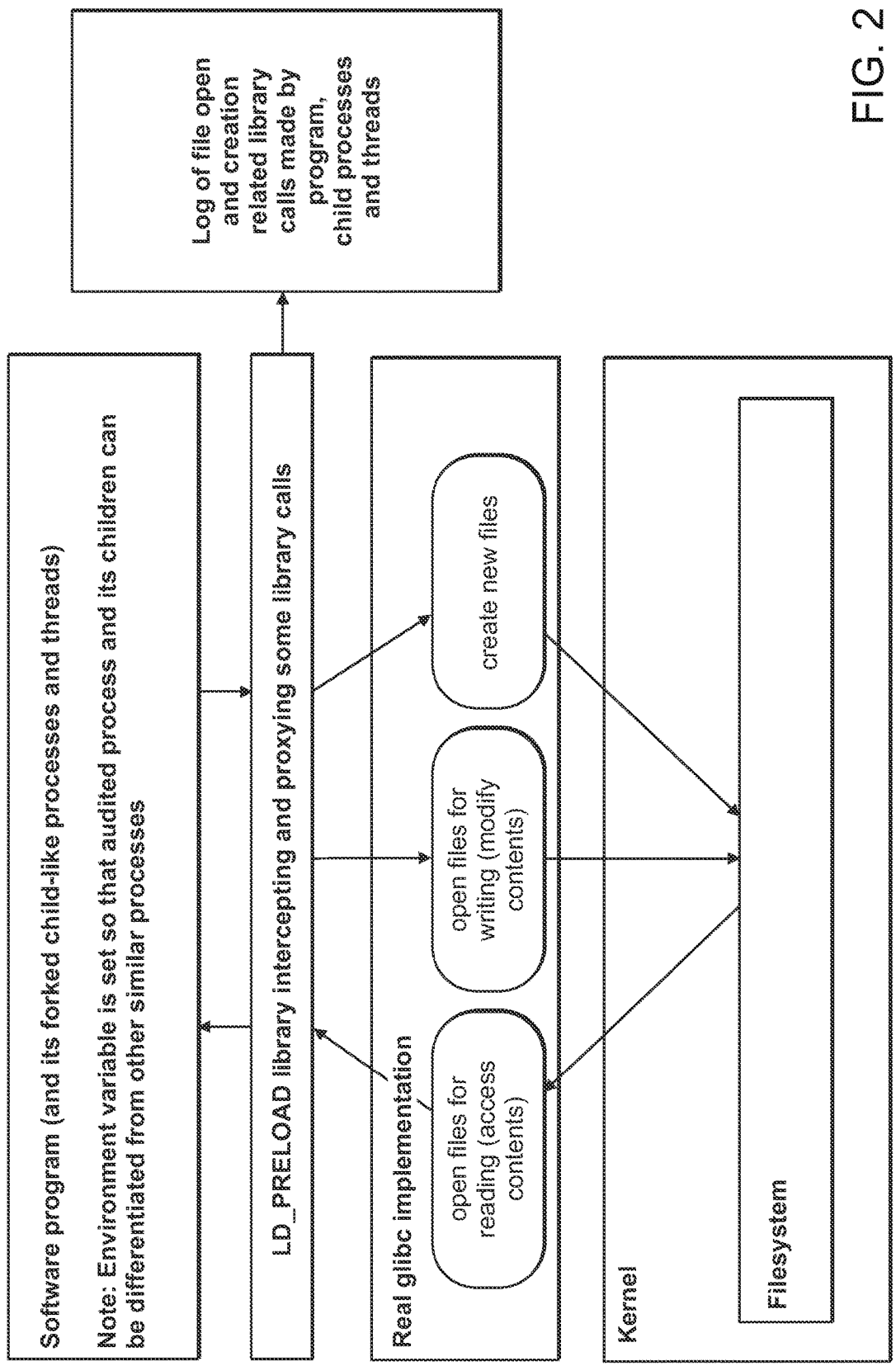
FIG. 2 illustrates an LD_PRELOAD library in accordance with one or more embodiments to audit file use and creation.

FIG. 2 illustrates the LD_PRELOAD library and how it can be used generically to audit file use and creation performed by a program and any child process and threads it spawns. By recording environment variables attached the target program being audited (and its children which inherit those environment variables), the library can produce logs that differentiate between programs and record internal process state. This capability allows multiple audited target programs to run in parallel while keeping independent track of their resource accesses.

Figure 3:
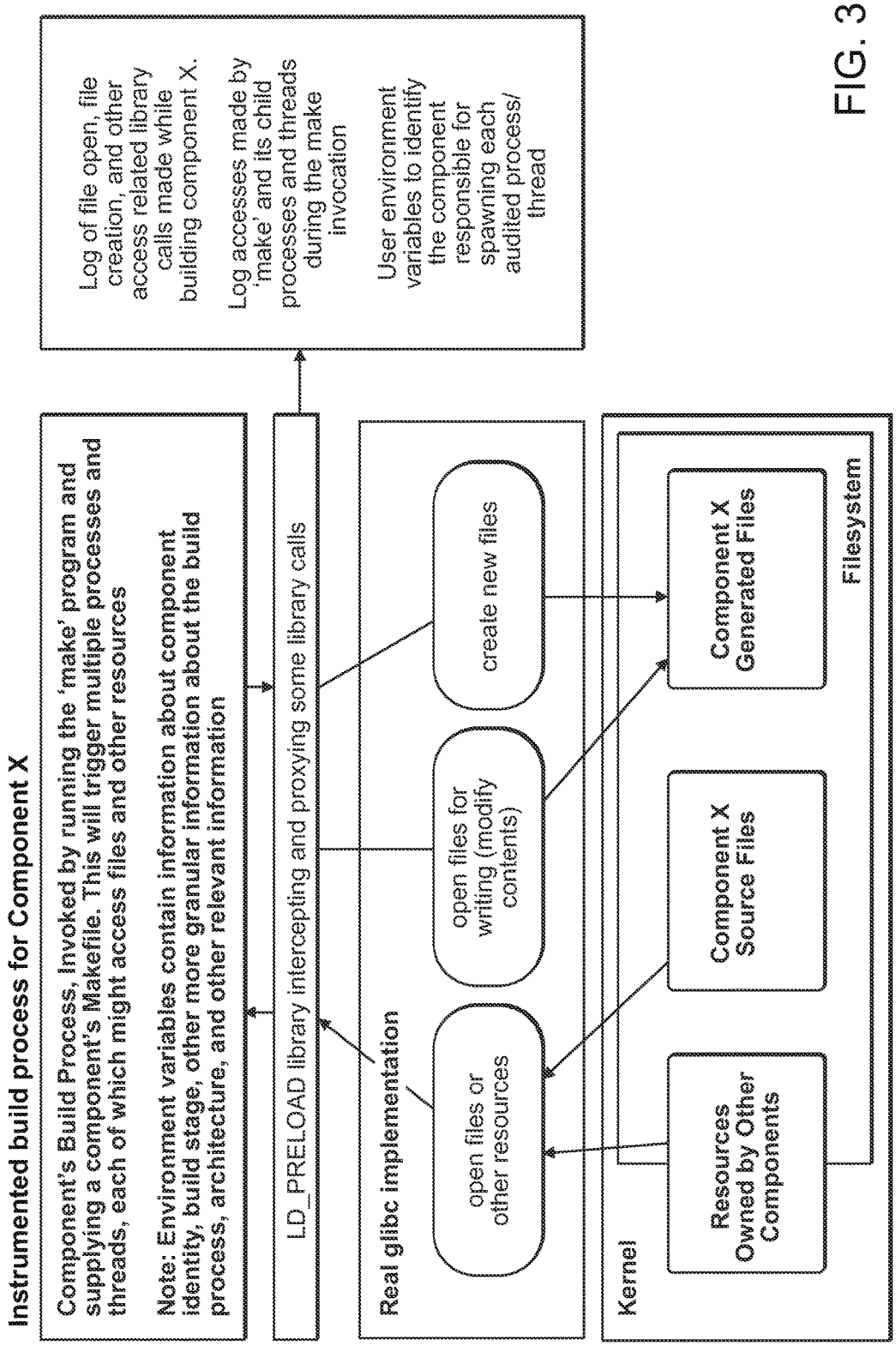
FIG. 3 illustrates how an LD_PRELOAD library in accordance with one or more embodiments can be used to produce audit logs in accordance with one or more embodiments.

FIG. 3 illustrates how the generic LD_PRELOAD library can be used to produce audit logs in accordance with one or more embodiments containing information about the files each component creates and the files and other resources it accesses.

The LD_PRELOAD library may be programmed to observe identifying environment variables set inside a component Makefile. Alternatively, the make program itself may be modified to automatically set appropriate environment variables to automatically coordinate functionality with the LD_PRELOAD library without relying on developers to make proper entries in their Makefiles. These environment variables can then be used within the LD_PRELOAD library to detect component identity, granular build information, and to log accordingly.

Granular build information may include the identity of the build target, the Makefile line, the module being compiled, computer architecture, etc.

This same scheme can be used to record the identity of a component whose build or test processes access any resource, not only file accesses. Also—while the 'make' program and Makefiles are used in the examples, the same scheme can easily be adapted to audit componentized build processes generically—such as those created using Java Ant, Ruby Rake, or Microsoft Project.

The LD_PRELOAD library may store audit logs on a per-component, process, and thread basis, and then later combine this information in a post-processing step once a component build has completed. If this is the case, a log rotation scheme should be used to prevent overwriting. Alternatively, synchronization via mutexes or semaphors may be used to construct a single log while it is being constructed. This log (or set of logs) may be stored in files, a database, an in-memory data structure, or some other data-store. Logs may contain timestamps recording the time of various resource accesses.

Performance considerations might impact the choice of logging scheme. For example, the use of mutexes or semaphors to construct a single time coherent log (rather than one that must be combined during post-processing) may be preferable if it is desired to maintain access information that is time-consistent across processes and threads belonging to a single component's build. This is preferable to recording the system time of each proxied resource access from within the LD_PRELOAD library from a performance perspective. If time coherence is not as important an issue, separate logs can be stored during the build process to eliminate the overhead of synchronization, and later post-processing can be done to combine logs.

Another consideration is whether audit information would be useful in real-time during a build or test process. If this is the case, it may be desirable to incur the overhead of inserting information into a data store that can provide easy real-time lookup and access. This might be useful, for instance, if it would be desirable to determine if a file access were legal in while the program was running so that a warning or error could be reported at that time rather than afterward.

In order to audit file reads and writes, the following glibc library calls can be included in the list of those proxied for Linux and UNIX operating systems: open( ), open64( ), fopen( ), fopen64( ), freopn( ), openat( ), creat( ), creat64( ), dlopen( ), rename( ), renameat( ), mkdir( ), link( ), linkat( ), symlink( ), symlinkat( ), remove( ), rmdir( ), unlink( ), unlinkat( ), chdir( ), and fchdir( ).

Note that this list of calls encompasses glibc calls related to file, directory, link, and symlink creation, opening, renaming, and deletion. The list of calls includes all those needed to determine if a software program accessed, created, modified, moved, or removed any file, directory, or link on the filesystem during its execution. Although many library calls are captured which affect files, directories, and links in a variety of ways, each call is classified generally as one that 'reads' (or accesses) a resource, 'writes' (or modifies) a resource, or 'creates' a resource. Some operations, such as a 'move,' are considered to both remove and create resources. While the program is executing, relative paths are converted to absolute paths in the logs. For this reason, we intercept library calls related to changing directories (chdir( ), fchdir( )) and keep track of the program's current working directory (CWD). While many intercepted functions are relatively simple proxies calling the underlying implementation, some (including rename( ), renameat( ), link( ), linkat( ), symlink( ), symlinkat( ), unlink( ), unlinkat( )) make additional calls to walk a filesystem tree so that logs contain enough context to reconstruct what was done to the filesystem by that library call. In some instances, the 'stat' command may optionally be called before the underlying implementation to determine if a file is created by the library call. If one chooses not to call 'stat' where the difference between an 'open for write' and 'file creation' is ambiguous, heuristics may be required to identify the owner of generated files. For some calls that affect the names of files in an entire subdirectory, such as when a directory is renamed, the auditing program might recursively descend through the directory and logs all of the files within its structure as being 'created' as part of the command (and all files positioned under the previously named tree as being 'deleted').

Note that while this example provided details for an LD_PRELOAD based implementation for UNIX & Linux, focused on the auditing of filesystem access, and assumed the component model's build process relied on 'make' technology, this scheme could be easily done on Microsoft Windows using a technology such as EasyHook, could easily be adapted to monitor other resources for which access is made through library calls, and can be used in concert with other build technologies such as Ant. In addition, this auditing process is generic, and can be used to gather information about resource access for processes other than builds. A natural extension, for instance, would be to audit resource access during unit- or system-tests, or during runtime to extract runtime dependencies which do not appear during the build or test process.

The following describes an exemplary implementation of an AuditD based solution for Linux. AuditD is another example of a technology that can be used to perform the same function as LD_PRELOAD in the overall system. While LD_PRELOAD can be used to intercept library calls emanating from a process and all of its children, AuditD can behave similarly from within the Linux Kernel. AuditD can be configured to log access to many different types of system resources. It can monitor and log access to specific filesystems or trees underneath a particular directory. Using this functionality for our purposes, AuditD can be configured to monitor and log file access for only the source code tree being built. It can also be configured to monitor the access of other arbitrary resources the component system controls such as network ports, database connections, etc.

Slight modifications might have to be made to the AuditD system to make it as useful as possible for our purposes. While AuditD records the PID and the PPID of a process that accesses (reads, writes, creates) a specific file, there is no straightforward means of mapping that PID/PPID back to the component being built. For this reason, a default AuditD implementation might require our audit process to build only one component at a time so that timestamps can be used to determine which component created or accessed each resource. Compiling multiple components simultaneously requires modification of AuditD so each child process or thread's PIDs can be correctly linked to the component whose build spawned it. One way of doing so is to modify AuditD to report an entire chain of parent PIDs back to the init (1) process for each log entry. Doing so will allow each descendant PID that should be audited to be linked to the PID of the top-level component build process that spawned it.

5. Generic Data Store for Architecture Auditing Information

The architecture dependency recording process described in previous sections generates a number of logs that should be stored in some structure, e.g., a relational or Nosql database, flat-files, an in-memory data structure, in a file, or on disk. Data may be transformed in various ways to optimize read performance, write performance, storage, or processing requirements.

Figure 4:
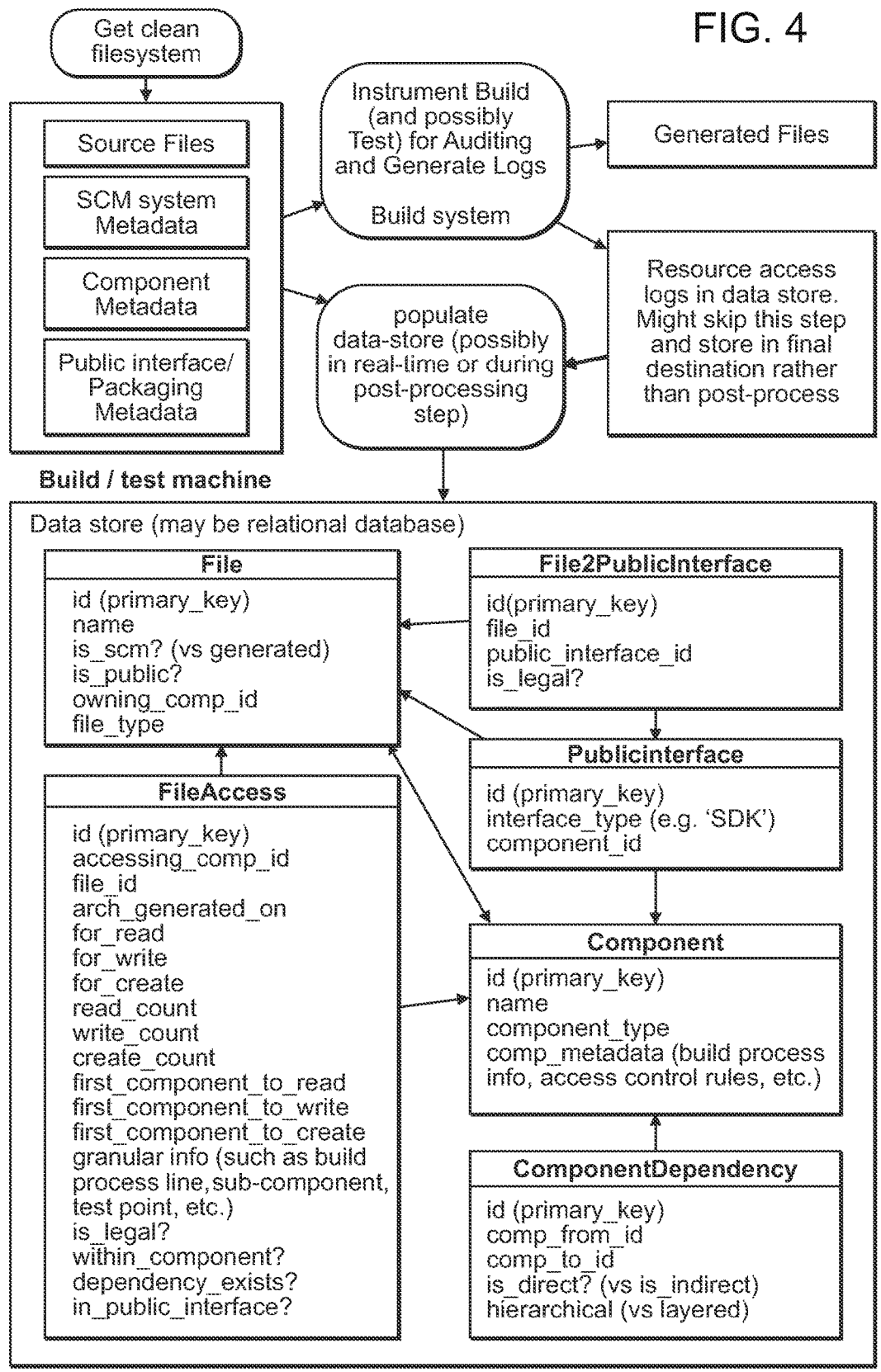
FIG. 4 illustrates an exemplary data store for architecture auditing information in accordance with one or more embodiments.

FIG. 4 illustrates data that should be stored in order to report architecture information and audit conformance with various architecture rules.

The data store contains information available in source code, code repositories, component metadata, and which is gathered by auditing build, test and runtime processes to capture resource access. Information about files (whether SCM or generated) is stored. Information about which component owns a file (via declaration or generation), whether a file is exposed via a component's 'public interface', and which components access each file during their build process or during unit- or system-testing. (Determining access during a test phase may expose run-time dependencies that are not apparent at build-time.) Component dependency information is stored to capture intended relationships between different parts of the codebase, and the hierarchical or layered relationships that bind modules in the overall system.

The data store also contains information that can be used to determine the legality of various resource access operations, and by extension be able to reason about the architectural quality and stability of the overall system. (In this picture, we illustrate filesystem accesses only, but it should be easy to adapt the scheme to support the representation of other types of resources.)

Finally, this picture of a data store shows between-file dependencies captured via traditional static analysis techniques using tools such as Scitool's 'Understand' product. Capturing file-dependencies via static analysis is useful for a variety of reasons that will be described in a later section.

Some of the information represented here can be pulled from metadata in the source tree itself. Other data produced during the build process by LD_PRELOAD, AuditD, strace, EasyHook, or similar technologies can be adapted for this purpose.

6. Reporting Architecture Information

Once data has been collected using the processes described above, it can be reported to developers to give them a new view into the structure of the system. This reporting can be done via spreadsheet, web interfaces, dashboards, command-line tools etc.

Developers could use this system to ask a variety of questions about the system to learn more about its structure. These may include things such as: (1) List all the files, and whether each is in the SCM system, or is generated. (2) List the architecture that created each generated file. (3) List all files a component owns, and whether each is SCM or generated. (4) List the component a file is owned or generated by. (5) Tell me if the file is in a component's public interface or private internals. (6) List all the files that a component accesses during its build process, and the component that owns them (i.e., which components does my component directly depend on). (7) List all of a component's files that are accessed by other components during their build processes. (8) List all components that access a specific file during their build process. (This may be useful if a public interface is changed, and one wishes to get a list of downstream components that should be tested or built to validate the change). (9) List all files that are 'public' (i.e., intended for use by other components). (10) Differentiate between accesses made by components with a direct dependency on a file's owner and an indirect dependency on a file's owner. (11) List all components depended upon by another component (declared dependency) either directly or indirectly. (12) List all components that depend upon a single component. (13) List static dependencies detected via static analysis tools between files and report component relationships. (14) List runtime dependencies gathered by instrumenting a running system for similar purposes. (15) List other metrics associated with files, components, packages, etc., such as build time, test coverage, Cyclomatic Complexity, file size, file count, or any other useful metric which may provide a nuanced and complete view to supplement purely architectural information.

Developers can use this information to: (1) Learn who talks to whom, does packaging, etc. (2) Learn about modularity, hierarchy, layering, reuse. (3) Facilitate redesign/refactoring conversations. (4) Report which resources are used by or use other resources throughout the system. Produce various visualizations, reports and metrics. (5) Measure use/reuse. (6) Dynamically update dependencies in the system to optimize build process in the future. Prune dependencies. (7) Find places where interfaces are used to communicate effectively with other teams. (8) Determine if old interfaces are in use that must be eliminated.

7. Reporting Problems

To use a component framework to impose order in a previously unstructured codebase or to maintain order in an ongoing fashion, metadata defining components and their relationships should be complete and correct. The software contained inside each component should not depend on external software in a manner that is not expressed at the component level. The following general rules should be adhered to for a componentized codebase to build, install, and run properly.

A. Every file F under source control should be uniquely assigned to a single component C. F is considered to be "owned" by C.

B. In general, every file F that is created during a build process should be created by only one component C1 and should not be later modified by another component C2. (Exceptions exist in some systems, but they introduce complications and should be avoided without a compelling rationale.) F is considered to be "owned" by C1 by virtue of the fact that C1 "generated" F.

C. No component C2 should delete a file F owned or created by another component C1.

D. If a component C2 accesses any file F owned or created by another component C1 during build time, testing, or run-time execution, C2 should have a declared dependency on C1.

E. If a component C2 accesses any file F owned or created by another component C1 during build time, test, or run-time execution, C1 should have a put F into its public interface.

F. Dependencies between components must not be cyclic (directly or indirectly).

G. If a component C1 is the owner or creator file F, only C1 is permitted to put F into its public interface.

Violations of these rules are undesirable because they embody coupling that are hard for developers to recognize because they couple the system in ways that degrade the architecture and subvert the benefits of hierarchy, modularity, and layering, and because they can lead to build failures.

The same spreadsheets, web services, dashboards, CLI tools, etc. described above to help developers better understand the structure and architecture of the system, can be used to report conditions considered bad or illegal according to the pre-defined component rules. They could be used to: (1) List files that are opened for writing by multiple components. (2) List SCM files that are opened for writing during the build process. (3) Determine which files does a component accesses even though it lacks a dependency on that file's owner. (4) Determine which components access a file even though they are not the owner and the file is not part of its owner's public interface. (5) Determine which of these illegal accesses create implicit circular dependencies between components (A declares a dependency on B, and B also accesses a file owned by A during A's build process). (6) Determine which files owned by a component are accessed illegally by other components (either because the file is non-public or because there is a missing direct or indirect dependency). (7) Determine if a component declares a file to be in its 'public' interface even though that component does not own the file. (8) Identify the subset of illegal accesses that can result in sporadic build failures (Highly likely when the accessed file is generated during the build process rather than being in the SCM system, and a dependency does not exist. Timing changes in a parallel build process can cause failures to reveal themselves occasionally). (9) Determine when a component accesses a file even though it only has an indirect dependency on the file's owner in situations where a direct dependency is required.

When developers have this information, they can use it to: (1) Eliminate some causes of sporadic build failures. (2) Eliminate circular dependencies. (3) Audit use against what is allowed or disallowed. (4) Find problems within and between components & teams. Fix architectural issues, public interfaces. (5) Facilitate refactoring/redesign efforts. 8. Tool and Process for Causing a Build, Test, or Integration Process to Fail if Architecture Violations are Detected The audit program described above can be modified to intervene rather than passively logging rule violations. By actively preventing attempted illegal accesses in real-time, it can be used to lock down proper behavior and prevent the introduction of architecture problems.

One way of doing this is to modify the previously described LD_PRELOAD library so that its proxy functions return failure codes when rule violations occur. This instrumentation could also print an error or warning message by interacting with make scripts to give the user a meaningful message about the reason for the failure. Tools such as strace, AuditD, EasyHook, etc., can also be used or modified to achieve similar effect either by themselves, or in combination with build system instrumentation.

Figure 5:
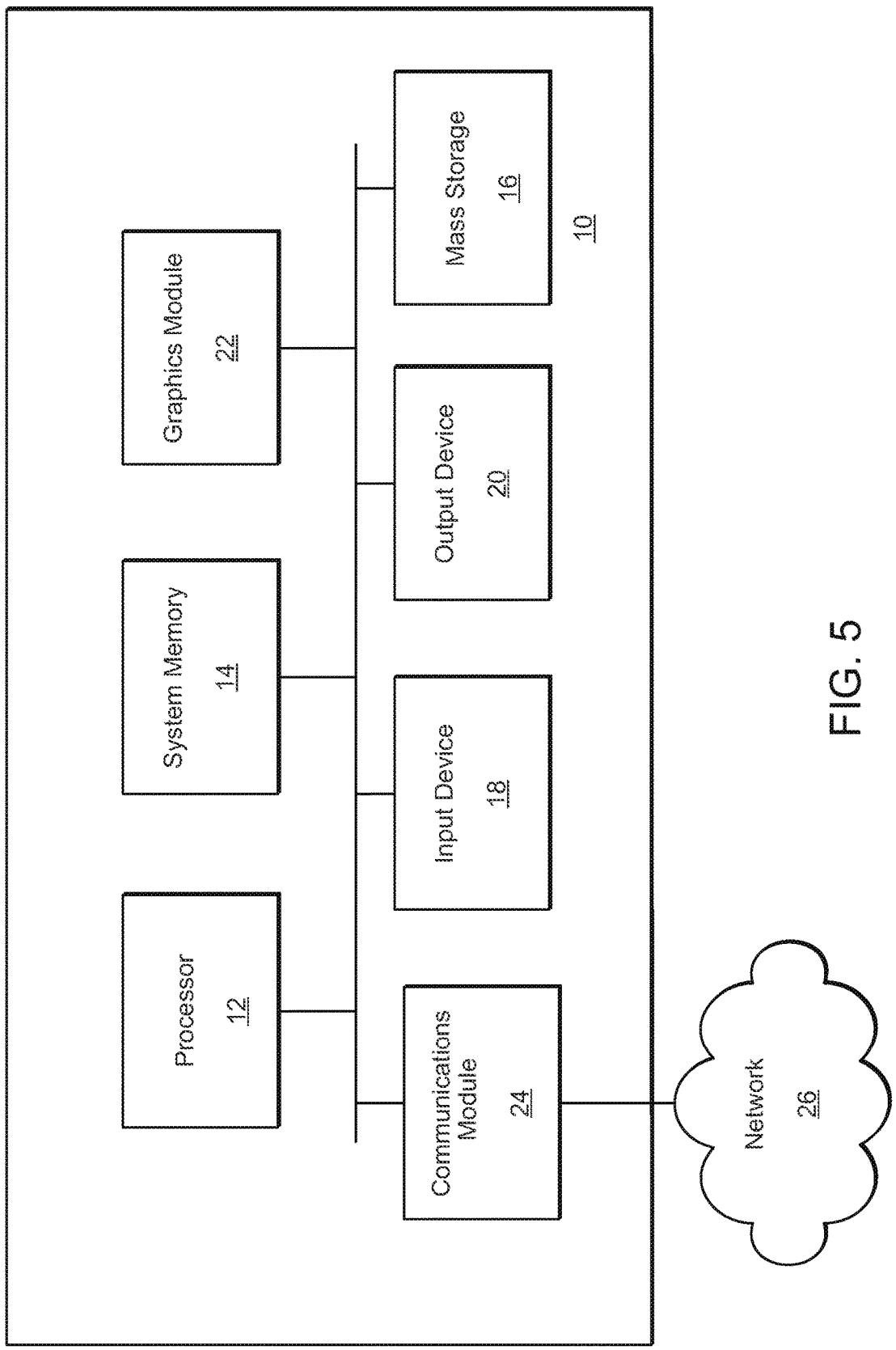
FIG. 5 illustrates an exemplary computer system on which processes described herein may be implemented in accordance with one or more embodiments.

The methods, operations, modules, and systems described herein may be implemented in one or more computer programs executing on a programmable computer system. FIG. 5 is a simplified block diagram illustrating an exemplary computer system 10, on which the computer programs may operate as a set of computer instructions. The computer system 10 includes at least one computer processor 12, system memory 14 (including a random access memory and a read-only memory) readable by the processor 12. The computer system also includes a mass storage device 16 (e.g., a hard disk drive, a solid-state storage device, an optical disk device, etc.). The computer processor 12 is capable of processing instructions stored in the system memory or mass storage device. The computer system additionally includes input/output devices 18, 20 (e.g., a display, keyboard, pointer device, etc.), a graphics module 22 for generating graphical objects, and a communication module or network interface 24, which manages communication with other devices via telecommunications and other networks 26.

Figure 6:
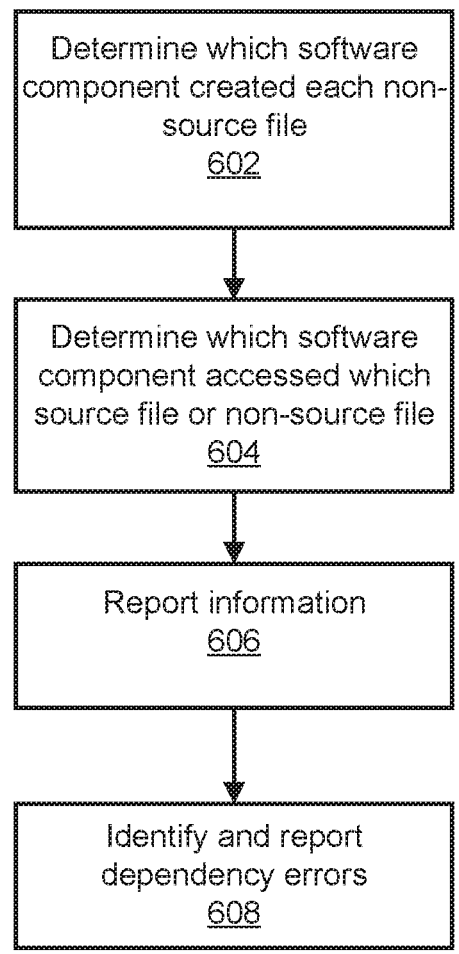
FIG. 6 illustrates an exemplary computer-implemented method for analyzing the structure of a software system executing on a computer system comprising a plurality of software components in accordance with one or more embodiments.
Figure 7:
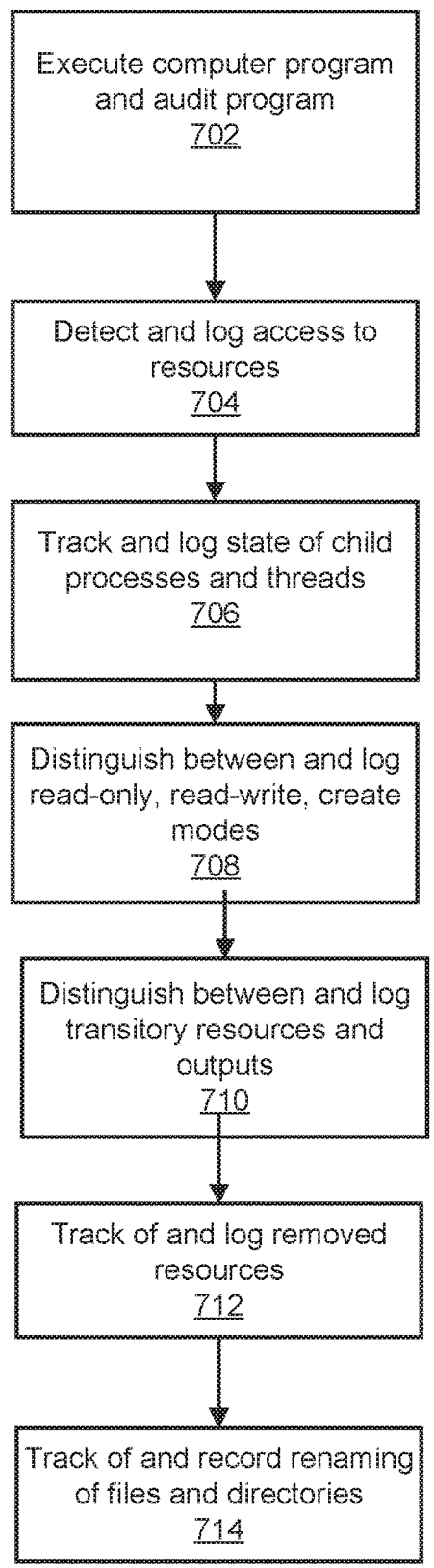
FIG. 7 illustrates an exemplary computer-implemented method for auditing a computer program in accordance with one or more embodiments.
Figure 8:
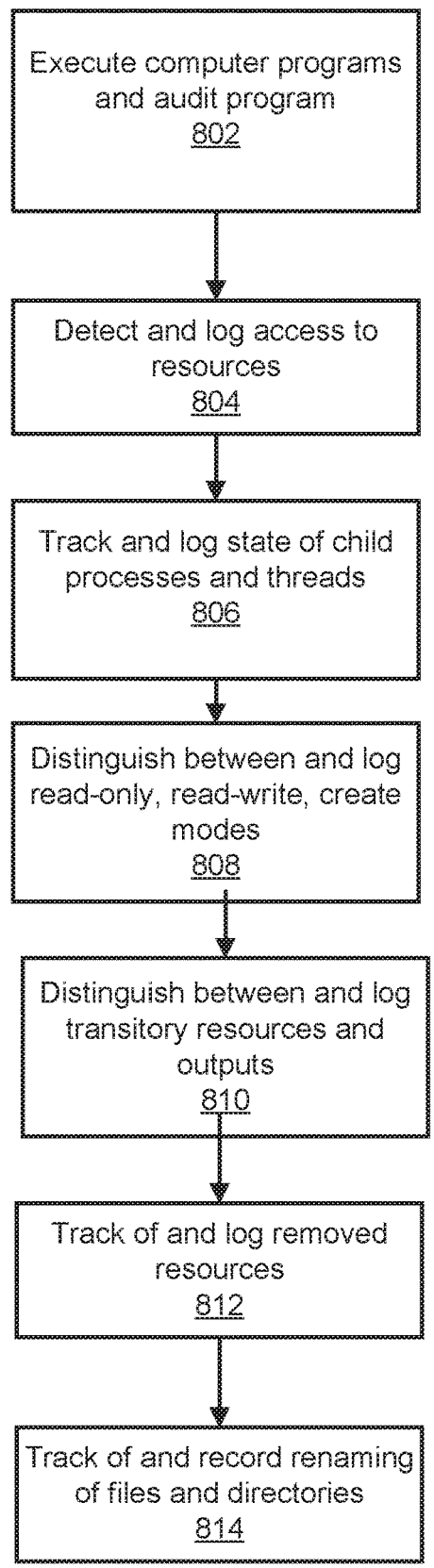
FIG. 8 illustrates an exemplary computer-implemented method for auditing a plurality of computer programs to determine their relationships with one another in accordance with one or more embodiments.

Each computer program can be a set of instructions or program code in a code module resident in the random access memory of the computer system. Until required by the computer system, the set of instructions may be stored in the mass storage device or on another computer system and downloaded via the Internet or other network. FIG. 6 illustrates an exemplary computer-implemented method for analyzing the structure of a software system executing on a computer system comprising a plurality of software components. The method incudes the steps of: (a) determining which software component in the software system created each non-source file during its build process at step 602; (b) determining which software component in the software system accessed which source file or non-source file during its build process, during testing, or during runtime at step 604; (c) reporting information generated in steps (a) and (b) at step 606; and (d) identifying and reporting dependency errors by testing consistency between the information generated in steps (a) and (b) and information received by the computer system on the software components in the software system, the resources owned or controlled by each software component, and the resources each software component can make use of as declared by metadata in order to identify the intended dependence relationships among the software components at step 608. FIG. 7 illustrates an exemplary computer-implemented method for auditing a computer program. The method includes the steps, performed by a computer system, of: (a) executing the computer program and an audit program on the computer system at step 702; (b) using the audit program to detect and log access to resources by the computer program and child processes and threads that the computer program recursively spawns during its operation at step 704; (c) using the audit program to track and log the state of child processes and threads used to resolve fully qualified paths of all resources being accessed at step 706; (d) using the audit program to distinguish between and log read-only, read-write, create modes of resource access at step 708; (e) using the audit program to distinguish between and log transitory resources and outputs at step 710; (f) using the audit program to keep track of and log resources that were removed at step 712; and (g) using the audit program to keep track of and record information of renaming of files and directories at step 714. FIG. 8 illustrates an exemplary computer-implemented method for auditing a plurality of computer programs to determine their relationships with one another. The method includes the steps, performed by a computer system, of: (a) executing the computer programs and an audit program on the computer system at step 802; (b) using the audit program to detect and log access to resources by each computer program and child processes and threads that the computer program recursively spawns during its operation in order to determine which computer program used resources created by another computer program at step 804; (c) using the audit program to track and log a state of child processes and threads used to resolve fully qualified paths of all resources being accessed at step 806; (d) using the audit program to distinguish between and log read-only, read-write, create modes of resource access at step 808; (e) using the audit program to distinguish between and log transitory resources and outputs at step 810; (f) using the audit program to keep track of and log resources that were removed at step 812; and (g) using the audit program to keep track of and record information of renaming of files and directories at step 814.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

What is claimed is:

1. A computer-implemented method for analyzing structure of a software system executing on a computer system comprising a plurality of software components, the method performed by the computer system comprising the steps of:
   (a) determining which software component in the software system created each non-source file during its build process;
   (b) determining which software component in the software system accessed which source file or non-source file during its build process, during testing, or during runtime;
   (c) reporting information generated in steps (a) and (b); and
   (d) identifying and reporting dependency errors by testing consistency between the information generated in steps (a) and (b) and information received by the computer system on the software components in the software system, the resources owned or controlled by each software component, and the resources each software component can make use of as declared by metadata in order to identify intended dependence relationships among the software components.

2. The method of claim 1, further comprising determining whether file accesses by software components conform to a given set of rules.

3. The method of claim 2, wherein one of said rules specifies that every source file is uniquely assigned to and owned by a single software component.

4. The method of claim 2, wherein one of said rules specifies that every file that is created during a build process is created by only one software component and should not be subsequently modified by another software component.

5. The method of claim 2, wherein one of said rules specifies that no software component can delete a file owned or created by another software component.

6. The method of claim 2, wherein one of said rules specifies that if a first software component accesses any file owned or created by a second software component during build time, testing, or run-time execution, the first software component should have only a declared dependency on the second software component, only an indirectly declared dependency on the second software component, or either a declared dependency or an indirectly declared dependency on the second software component.

7. The method of claim 2, wherein one of said rules specifies that a first software component can only access a file owned or created by a second software component during build time, test, or run-time execution if metadata indicates that the file is part of the second component's public interface.

8. The method of claim 2, wherein one of said rules specifies that only files owned or created by a software component are allowed to be put into the software component's public interface.

9. The method of claim 2, wherein one of said rules specifies that a software component cannot access a read-only file owned by another software component in a read-write mode or a create mode.

10. The method of claim 1, wherein steps (a) and (b) comprise instrumenting each software component's build process to identify resources accessed by the software component during the build process.

11. The method of claim 1, wherein step (b) comprises recording each file access along with state information identifying the software component performing the file access.

12. The method of claim 11, wherein recording file accesses is performed by instrumenting a computer operating system or computer file system the software component is reading from or writing to record accesses performed by the software component.

13. The method of claim 11, wherein recording file accesses is performed by recording system calls or library calls.

14. The method of claim 11, wherein recording file accesses is performed without interfering with the file accesses.

15. The method of claim 11, further comprising enforcing access control rules in real-time by preventing the access of given resources by a software component.

16. The method of claim 11, further comprising selectively enforcing access control rules in real-time by preventing the access of particular resources by a software component.

17. The method of claim 1, wherein the information reported in step (c) identifies each file owned by a software component and whether the file is a Source Control Management (SCM) file managed by a source control system or is a generated file.

18. The method of claim 1, wherein the information reported in step (c) identifies which software component owns or has generated which file.

19. The method of claim 1, wherein the information reported in step (c) identifies the files a software component has accessed during its build process, and identifies which software component owns said files.

20. The method of claim 1, wherein the information reported in step (c) identifies each software component's files that are accessed by other software components during their respective build processes.

21. A computer system, comprising:
at least one processor;
memory associated with the at least one processor; and
a program stored in the memory for analyzing the structure of a software system executing on a computer system comprising a plurality of software components, the program containing a plurality of instructions which, when executed by the at least one processor, cause the at least one processor to:
(a) determine which software component in the computer system created each non-source file during its build process;
(b) determine which software component in the computer system accessed which source file or non-source file during its build process, during testing, or during runtime;
(c) report information generated in steps (a) and (b); and
(d) identify and report dependency errors by testing consistency between the information generated in (a) and (b) and information received by the computer system on the software components in the software system, the resources owned or controlled by each software component, and the resources each software component can make use of as declared by metadata in order to identify intended dependence relationships among the software components.

22. A computer-implemented method for auditing a computer program, the method comprising the steps, performed by a computer system, of:
(a) executing the computer program and an audit program on the computer system;
(b) detecting and logging, using the audit program, access to resources by the computer program and child processes and threads that the computer program recursively spawns during its operation;
(c) tracking and logging, using the audit program, a state of child processes and threads used to resolve fully qualified paths of all resources being accessed;
(d) distinguishing, using the audit program, between and log read-only, read-write, create modes of resource access;
(e) distinguishing, using the audit program, between and log transitory resources and outputs;
(f) keeping track of and logging, using the audit program, resources that were removed; and
(g) keeping track of and recording, using the audit program, information on renaming of files and directories.

23. The method of claim 22, further comprising modifying a kickoff process executing on the computer system to indicate to an operating system or file system of the computer system that the computer program is being audited.

24. The method of claim 22, wherein executing the audit program comprises inserting a shim between an operating system and the computer program at a system call or a library call layer of the computer system and inserting the audit program recursively underneath the child processes and threads of the computer program.

25. The method of claim 22, wherein step (d) further comprises differentiating between a previously existing file and a newly created file when a read-write access is detected.

26. A computer system, comprising:
at least one processor;
memory associated with the at least one processor; and
an audit program stored in the memory for auditing a computer program, the audit program containing a plurality of instructions which, when executed by the at least one processor, cause the at least one processor to:
(a) execute the computer program on the computer system with the audit program;
(b) detect and log access to resources by the computer program and child processes and threads that the computer program recursively spawns during its operation;
(c) track and log a state of child processes and threads used to resolve fully qualified paths of all resources being accessed;
(d) distinguish between and log read-only, read-write, create modes of resource access;
(e) distinguish between and log transitory resources and outputs;
(f) keep track of and log resources that were removed; and
(g) keep track of and record information of renaming of files and directories.

27. A computer-implemented method for auditing a plurality of computer programs to determine their relationships with one another, the method comprising the steps, performed by a computer system, of:
(a) executing the computer programs and an audit program on the computer system;
(b) detecting and logging, using the audit program, access to resources by each computer program and child processes and threads that the computer program recursively spawns during its operation in order to determine which computer program used resources created by another computer program;
(c) tracking and logging, using the audit program, a state of child processes and threads used to resolve fully qualified paths of all resources being accessed;
(d) distinguishing, using the audit program, between and log read-only, read-write, create modes of resource access;
(e) distinguishing, using the audit program, between and log transitory resources and outputs;
(f) keeping track of and logging, using the audit program, resources that were removed; and
(g) keeping track of and recording, using the audit program, information of renaming of files and directories.

28. The method of claim 27, further comprising modifying a kickoff process executing on the computer system to indicate to an operating system or file system of the computer system that the computer programs are being audited.

29. The method of claim 27, wherein executing the audit program comprises inserting a shim between an operating system and each of the computer programs at a system call or a library call layer of the computer system and inserting the audit program recursively underneath the child processes and threads of the computer program.

30. The method of claim 27, wherein step (e) further comprises differentiating between a previously existing file and a newly created file when a read-write access is detected.

31. A computer system, comprising:
   at least one processor;
   memory associated with the at least one processor; and
   an audit program stored in the memory for auditing a plurality of computer programs to determine their relationships with one another, the audit program containing a plurality of instructions which, when executed by the at least one processor, cause the at least one processor to:

(a) execute the computer programs on the computer system with the audit program;

(b) detect and log access to resources by each computer program and child processes and threads that the computer program recursively spawns during its operation in order to determine which computer program used resources created by another computer program;

(c) track and log a state of child processes and threads used to resolve fully qualified paths of all resources being accessed;

(d) distinguish between and log read-only, read-write, create modes of resource access;

(e) distinguish between and log transitory resources and outputs;

(f) keep track of and log resources that were removed; and (g) keep track of and record information of renaming of files and directories.

* * * * *